Patented Feb. 27, 1923.

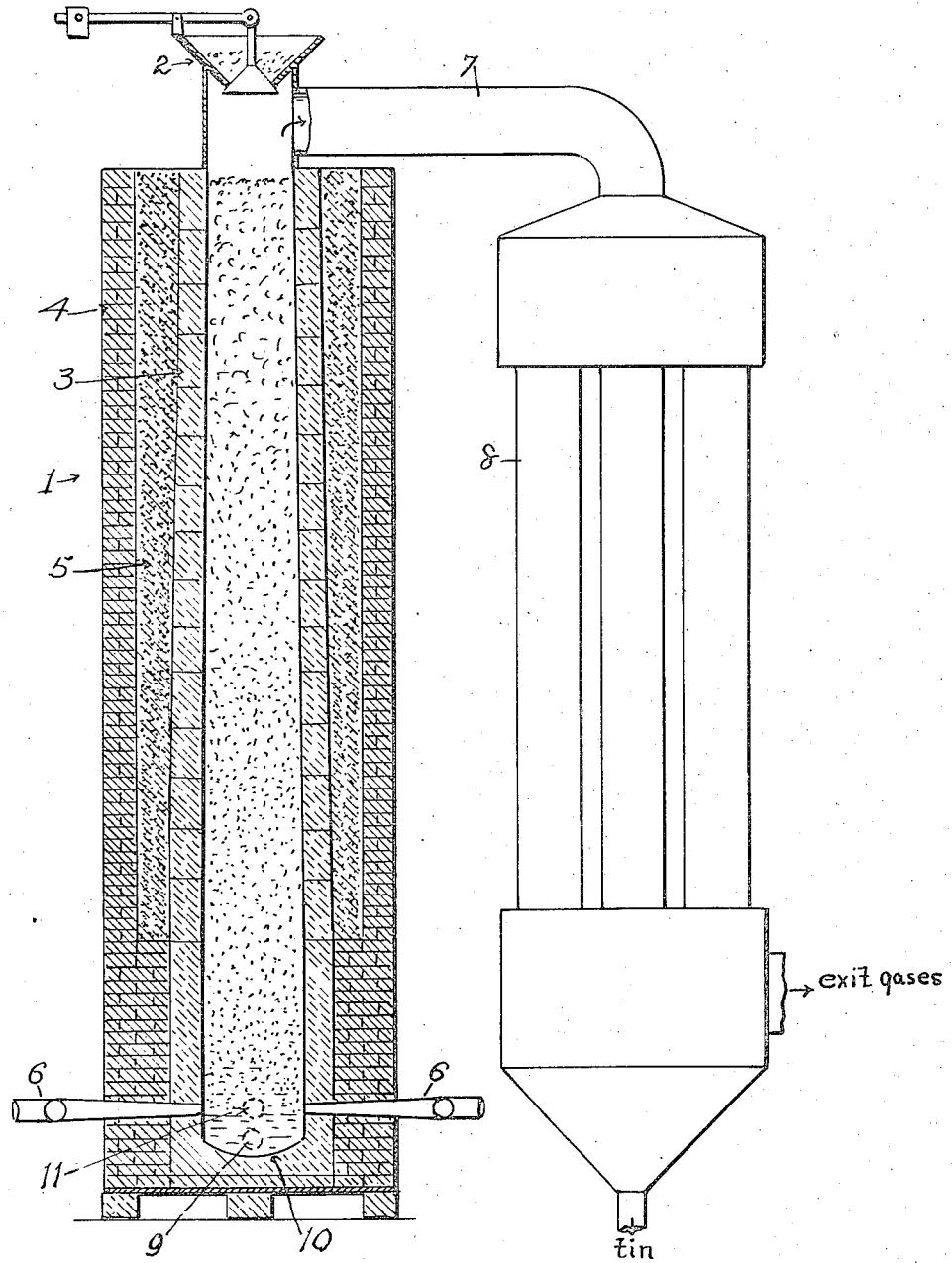

1,446,953

UNITED STATES PATENT OFFICE.

HARRY V. WELCH, OF LOS ANGELES, AND WALTER A. SHEEK, OF LONG BEACH, CALIFORNIA, ASSIGNORS TO INTERNATIONAL PRECIPITATION COMPANY, OF LOS ANGELES, CALIFORNIA, A CORPORATION OF CALIFORNIA.

PROCESS FOR THE RECOVERY OF TIN AND IRON PRODUCTS FROM TINNED-IRON WASTE.

Application filed October 25, 1921. Serial No. 510,233.

*To all whom it may concern:*

Be it known that we, HARRY V. WELCH and WALTER A. SHEEK citizens of the United States, residing, respectively, at Los Angeles in the county of Los Angeles and State of California, and at Long Beach, in the county of Los Angleles and State of California, have invented a new and useful Process for the Recovery of Tin and Iron Products from Tinned-Iron Waste, of which the following is a specification.

This invention relates to the treatment of tin scrap, tin cans, and other tinned-iron waste, to recover the tin and the iron thereof in commercially available form. The main object of the present invention is to provide for separation of the tin from the iron of such materials in such manner that the iron will be of greater commercial value than when it is contaminated with the tin, such as in the case where tin scrap, etc., is melted down in a cupola furnace, or otherwise. In such cases, the resulting iron is of poor quality and is used only for a comparatively cheap class of castings. By eliminating the tin we are enabled to produce iron which is sufficiently pure to enable it to be used in making high grade castings, or pig iron of good quality.

A further object of the invention is to enable the separation and recovery of the tin and the production of iron substantially free from tin by smelting or melting operation similar to that taking place in the ordinary cupola furnace but with certain modifications which we have found necessary for the elimination of the tin. By providing for carrying out the separation process in this manner the tin and iron may be separately recovered at a cost which is but little in excess of that of the production of low grade castings heretofore produced in a cupola furnace from tin scrap, or tin cans. etc. As applied to tin cans, our invention also enables the recovery, if desired, of the lead content present in the solder used in the cans.

The accompanying drawing illustrates an apparatus suitable for carrying out our invention, said drawing being a vertical section of such an apparatus.

The apparatus preferably used for carrying out our invention comprises a vertical shaft furnace similar to a cupola furnace but preferably of considerably greater height in proportion to its diameter so as to allow for a greater time of exposure to the heat before fusion takes place, or a more gradual heating of such material in order to enable effective elimination of the tin from the metallic surfaces. Said shaft furnace, indicated at 1, may be provided at the top with suitable means 2 of any usual or suitable type for continuously or intermittently feeding the charge of material thereto, or to permit of such continuous or intermittent feeding. The shaft furnace is lined with or constructed of suitable refractory material. For example, the furnace may have a lining or inner wall 3 of firebrick, magnesia brick, or the like, and another wall 4 of ordinary brick with an intervening layer 5 of diatomaceous earth or other thermal insulation. The furnace, at its lower portion, is provided with a tap hole 9 for withdrawing melted metal and with tuyères 6 for supply of air thereto. From the upper part of the furnace a flue 7 may lead to any suitable means for collecting the volatilized metal fumes containing tin or lead and tin, such collecting means may, for example, consist of an electrical precipitator, or a Cottrell gas treater, such as indicated at 8.

Our invention is of especial value in connection with the separation and production of iron and tin from empty tin cans, and will be described as applied in that connection. Such cans are preferably first subjected to any suitable operation for increasing the surface exposure of the metal, for example, the cans may be compressed in bales and then shredded, torn or cut by suitable machinery into the form of strips, shavings. or fragments of any suitable size and shape. If desired, the material may be treated before or after such operation with suitable cleaning agents, such as water, or dilute alkali to remove grease, or other organic matter present. This is, however, not necessary since in the operation of the process, as hereinafter described, any such organic material would be decomposed and eliminated in the first stages of the operation.

The tinned iron waste is charged into the shaft furnace 1 with a suitable amount of reducing agent consisting of carbonaceous materials such as carbon or coke, being incorporated or mixed with the tinned iron material or charged into the furnace in alternate layers with the tinned iron waste, the amount of such carbonaceous material being sufficient to perform the several functions necessary for the operations hereinafter described, namely:

First, to furnish by combustion with air supplied through tuyères 4 the heat necessary for volatilization of the tin and lead, and for fusion of the iron in the tinned iron waste;

Second, to maintain a reducing atmosphere in the furnace, particularly in the lower portion thereof;

Third, to furnish carbon to the iron in case pig iron or cast iron is the product desired;

Fourth, to serve as a carrier or support for the tinned iron waste constituting the burden of the charge so as to ensure maintenance of a pervious condition of the charge suitable for the exit for the gases of combustion and volatilized metal, and for descent of the fused metal in the hearth at the bottom of the furnace.

If desired, fuel gas, producer gas, or other gaseous fuel may be supplied to the furnaces, for example at one or more of the tuyères 6 to assist in the heating action and to ensure maintenance of a reducing atmosphere. If such gaseous fuel is used, the amount of solid carbon added with the charge may be correspondingly reduced.

It will be understood that in starting up the furnace, an excess of carbonaceous material will be provided in order to bring the lower part of the furnace to the requisite high temperature, air being supplied through the tuyères 6 so as to cause combustion of such carbonaceous material and the hot products of combustion rising through the overlying burden and escaping through the flue 7 at the top of the furnace. In passing through the burden or charge at the upper part of the furnace these hot products of combustion gradually heat the descending tinned iron waste material and we have found that by providing a sufficient time of exposure of the material to the heat of the hot gases or products of combustion before such material reaches the fusion point of the iron, and passing a sufficient volume of hot gases in contact with the material, substantially complete elimination or volatilization of the tin and lead from the metallic surfaces can be secured.

The conditions under which cupola or blast furnace operations are generally carried out, are conducive to rapid melting of the charge, and when tin waste is used in these operations, such conditions are unfavorable for volatilization of the tin, the greater part of which enters the fused iron, resulting not only in loss of the tin as such, but in deterioration of the iron product. The boiling point of tin being considerably above the melting point of iron, the ordinary melting operation does not give opportunity for the tin to be volatilized and driven off before the iron is melted. At a temperature approximating the melting point of iron, tin has a vapor tension of about one millimeter of mercury and a stream of gases at that temperature can, therefore, carry away about 1/800 of its volume of tin in form of vapor or gas assuming full saturation of such gases. In order to completely or substantially remove the tin at or below this temperature, it is necessary to pass sufficient volume of hot gases in contact with the tin waste to carry away all the tin under the slight partial pressure presented by the tin at temperatures below the melting point of iron. For this purpose, the amount of hot gases must be in excess of five times the weight of the tinned iron scrap present, that is to say, assuming said tin iron scrap to contain approximately two per cent tin for every pound of tinned iron present, at least five pounds of hot gases must be supplied, such gases consisting of the products of combustion, including nitrogen or other inert gases introduced with the air through tuyères 6. To effect this, the time of exposure to heat before melting takes place, the temperature of the different parts of the column of material in the furnace, and the rate of supply of air, with or without fuel gas, and with or without inert gases, are so controlled that by the time the iron is fused, sufficient hot gases will have passed in contact with the tinned iron waste to take up substantially all the tin under the actual condition of saturation or partial saturation of the gases with tin.

There may also be incorporated with the charge as it is fed into the top of the furnace any suitable fluxing material such as limestone, and, if found desirable in any particular case, a volatilizing agent, that is to say a substance capable of reacting with the tin or lead, or both, to expedite or facilitate vaporization of the tin and lead values may also be added to the charge. For this purpose, chlorine gas, or materials capable of producing chlorine, may be used. For example, sodium chloride, calcium chloride, or other chlorides or halides may be used, or such volatilizing agents may be injected into the charge through the tuyères at the lower part of the furnace being, for example, fed into the air blast supplied from such tuyères. In case such volatilizing agents are used, the amount of gases passed in and out with the materials, and the time of exposure of the material to the heat before fusion takes place may be decreased but, in any case, we have found it desirable to provide for a time of exposure considerably in excess of the time presented in ordinary cupola practice.

By the time the material reaches the fusion zone at the bottom part of the shaft furnace the tin and lead are substantially eliminated therefrom and the high temperature existing or produced in such lower part of the furnace causes fusion of the residual iron, the resulting fused product running down on the hearth 10. Under conditions of practice there will generally be sufficient carbon present to form a carbonized product, which may be drawn off from the hearth through the tap 9 and formed into castings or pigs, as may be desired. Any slag formed in the operation may be drawn through the slag hole 11.

By reason of the freedom of the resulting fused product from tin or lead, said product is of high commercial value as compared with the ordinary castings made from tinned iron waste by the usual cupola operation.

It will be understood that suitable modifications may be made in the furnace, when required, to adapt the same to particular cases. For example, it may in some cases be desirable to provide a water jacket or other cooling means around the lower part of the furnace to prevent injury to the furnace by overheating.

The tin or tin and lead fume carried off with the gases as above described, is collected in any suitable manner by filtration, electrical precipitation or otherwise, and may be collected in the form of finely divided metallic tin or oxide or chloride or other compound, according to the manner in which the process is carried out.

What we claim is:

1. The method which consists in heating tinned iron waste in a reducing atmosphere and while passing hot gases in contact with such waste under such conditions of temperature and sufficient volume of gas flow to volatilize and carry off substantially all of the tin from such material and subjecting the residual iron to sufficient heat to fuse the same.

2. The method which consists in mixing tinned iron waste with carbonaceous material, subjecting the mixture to heat while passing hot gases through and in contact with such materials such heating operation being continued without melting the iron for a sufficient time to cause substantially all of the tin to be volatilized and to be carried off by the said hot gases and residual iron being then further heated to fuse the same.

3. The process of treating tinned iron waste which consists in mixing said waste with carbonaceous material and subjecting the mixture to contact with hot gases, said gases being applied in sufficient volume and at such temperature as to substantially volatilize the tin content of the tinned iron waste and then subjecting the residual iron to further heating action to melt the same.

4. The process of recovering tin and iron from tinned iron waste which consists in mixing the tinned iron waste in suitably divided condition with carbonaceous material in suitably divided condition, supplying air to the mixture and effecting combustion of some of the carbonaceous material by the action of such air in such manner as to gradually raise the said material to the fusion point of iron, the operation being carried on in such manner that the amount of hot gaseous production of combustion passed in contact with the material before the iron is fused, is sufficient to substantially volatilize and carry off the tin content of the material, and conducting the tin carried off with the gases.

5. The method which consists in mixing tinned iron waste with carbonaceous material, subjecting the mixture to heat while passing hot gases through and in contact with such material during such heating operation, supplying fuel gas and air to the mixture during such operation to assist in the heating thereof of materials, continuing such heating operation without fusing the iron and passage of hot gases until the tin is substantially volatilized and then continuing the heating operation to fuse the residual iron.

6. The method which consists in feeding tinned iron waste in a reducing atmosphere and in the presence of a chloridizing agent and passing hot gases in contact with such tinned iron waste during such heating operation to effect volatilization of the tin content of such material and heating the residual iron to effect fusion of same.

7. The method which consists in continuously applying a charge of tinned iron waste and carbonaceous material to the upper part of a furnace of the cupola type, supplying air to the lowest part of said furnace to effect combustion of such carbonaceous material in such manner as to effect gradual heating of the column of the charge from said furnaces in the descent of such charge and to substantially volatilize and carry off the tin content of the tinned iron waste and to fuse the residual iron, and withdrawing such fused iron from the lower part of the furnace.

8. A method as set forth in claim 7 comprising in addition, supplying fuel gas to the column of charge in the furnace for combustion with the air supplied to such column to assist in furnishing heat required for the volatilizing and fusing operations.

9. The process which consists in heating tinned iron material with carbonaceous material to a temperature approaching the melting point of iron, passing hot gases in contact with such materials, while they are being so heated, the volume of hot gases so passed being so proportioned with respect to the vapor tension of tin and to the more or less complete saturation of the gases with tin, as existing in the furnace; that the tin content of the tinned iron is substantially volatilized and carried off, with such gases, collecting the tin so carried off in such gases, and subjecting the residual iron to further heating operation to melt the same.

In testimony whereof we have hereunto subscribed our names this 20th day of October 1921.

HARRY V. WELCH.
WALTER A. SHEEK.